United States Patent [19]

Patel

[11] Patent Number: 4,673,577

[45] Date of Patent: Jun. 16, 1987

[54] SHELLAC ENCAPSULANT FOR HIGH-POTENCY SWEETENERS IN CHEWING GUM

[75] Inventor: Mansukh M. Patel, Villa Park, Ill.

[73] Assignee: Wm. Wrigley Jr. Company, Chicago, Ill.

[21] Appl. No.: 745,361

[22] Filed: Jun. 12, 1985

Related U.S. Application Data

[63] Continuation of Ser. No. 467,604, Feb. 18, 1983, abandoned.

[51] Int. Cl.$^4$ .................. A23G 3/30; A23L 1/236
[52] U.S. Cl. ................................ 426/5; 426/96; 426/548; 426/302
[58] Field of Search .................. 426/3–6, 426/534, 96, 650, 651, 548, 658, 103, 302

[56] References Cited

U.S. PATENT DOCUMENTS

| | | | |
|---|---|---|---|
| 3,741,795 | 6/1973 | Signorino | 426/103 |
| 3,914,439 | 5/1985 | Graves | 426/78 |
| 3,962,463 | 6/1976 | Witzel | 426/5 |
| 4,384,004 | 5/1983 | Cea et al. | 426/3 |
| 4,515,769 | 2/1983 | Merritt et al. | 424/49 |

FOREIGN PATENT DOCUMENTS 0024297  5/1985  European Pat. Off. .
2476986  5/1985  France .

OTHER PUBLICATIONS

D. V. Korshack and R. V. Vinogradova, Polyesters, Pergammon Press, 1965, p. 427; *Chem. Abstracts,* vol. 18 No. 8, 2995 n.

*Kirk–Othmer Encyclopedia of Chemical Technology,* John Wiley & Sons, 3d. ed. 1982, pp. 737, 738.

*Primary Examiner*—Jeanette Hunter
*Attorney, Agent, or Firm*—Willian Brinks Olds Hofer Gilson & Lione Ltd.

[57] ABSTRACT

A food-grade shellac is used as an encapsulating agent for high potentcy sweeteners in chewing gum compositions. The shellac provides an impermeable, hydrophobic coating which is substantially insoluble in the chewing gum base.

5 Claims, No Drawings

4,673,577

SHELLAC ENCAPSULANT FOR HIGH-POTENCY SWEETENERS IN CHEWING GUM

This application is a continuation, of application Ser. No. 467,604, filed Feb. 18, 1983, now abandoned.

BACKGROUND OF THE INVENTION

This invention relates in general to chewing gum compositions and, in particular, to the improvement comprising a food-grade shellac encapsulant for active chewing gum ingredients.

As is well-known in the art, chewing gum comprises a neutral and tasteless masticatory chewing gum base and one or more non-masticatory active ingredients mixed into the base. As used herein, an "active ingredient" is an ingredient such as a sweetener, a flavoring agent or a food-grade acid which determines flavor and taste characteristics of the gum; a body-treating ingredient such as a medicinal drug or pharmaceutical agent which is released at a gradual rate and ingested during chewing; or a breadth-freshening ingredient which treats or reduces oral malodor. In addition, the chewing gum may, and usually does, contain water-soluble and usually sweet non-masticatory bulking agents, a coloring agent and a plasticizing agent, the latter employed to improve the texture of the gum.

Certain active chewing gum ingredients benefit from or require encapsulation in order to achieve a gradual and controlled release of the ingredients during chewing or to promote their stability in chewing gum. For example, certain artificial sweeteners such as the dipeptide sweetener aspartame (L-aspartyl-L-phenylalanine methyl ester) have been found to be excellent sugar substitutes in chewing gum. However, the stability of artificial dipeptide sweeteners is a function of water activity, time, temperature and pH. Under unfavorable conditions, aspartame spontaneously converts to diketopiperazine with proportional loss of sweetness. Aspartame also degrades as the result of reactions with aldehydes present in certain flavors. In order to maintain the stability and sweetness of aspartame in chewing gum, it is necessary to reduce as far as possible the exposure of the aspartame to moisture, certain flavors and certain pH conditions.

Although the general technique of encapsulating ingredients is well-known, the prior art known to applicant does not teach satisfactory encapsulating agents for active chewing gum ingredients. For example, U.S. Pat. Nos. 4,122,195 and 4,139,639 discloses encapsulation of aspartame in Capsul dextrin and gum arabic. However, such encapsulants, which are hydrophilic and moisture-permeable, have been found to be of only limited effectiveness in preventing the degradation of aspartame in chewing gum.

While it would seem that hydrophobic encapsulating agents would provide better impermeability and gradual release characteristics than hydrophilic coatings, applicant is unaware of any hydrophobic coatings which have been successfully employed in the past for active chewing gum ingredients. Most hydrophobic materials which could be used as encapsulants, such as polyvinyl acetate, waxes and fats, are dissolved in the chewing gum base when they are mixed into the heated gum mass during the gum manufacturing process. Other hydrophobic materials such as high molecular weight polyvinyl acetate and styrene butadiene rubber are substantially insoluble in the food-grade solvents which are required in encapsulating processes. Applicant is unaware of any prior disclosure of hydrophobic encapsulating materials which have both of the necessary qualities of being insoluble in chewing gum base yet sufficiently soluble in the food-grade solvents used in encapsulating processes.

SUMMARY OF THE INVENTION

According to the present invention, a food-grade shellac is used as an encapsulating agent for one or more active chewing gum ingredients, which are sweeteners, flavoring agents, food-grade acids, pharmaceutical agents or breath-freshening agents.

The shellac encapsulant, which is hydrophobic and insoluble in the gum base yet soluble in food-grade solvents such as ethanol, provides a substantially impermeable coating for such active gum ingredients and achieves a controlled, gradual release of the ingredients as the encapsulant is broken down during chewing.

Another advantage is that the shellac coating prevents flavors and other hydrophobic ingredients from becoming irreversibly absorbed by the gum base, thereby permitting use of a smaller quantity of the ingredient to achieve its desired effect.

When used to coat dipeptide sweeteners, the shellac encapsulant substantially maintains their sweetness during storage of the chewing gum by minimizing the degradation of the dipeptide sweeteners to diketopiperazine or their reaction with aldehydes in certain chewing gum flavors.

DESCRIPTION OF THE INVENTION

In the present invention, the chewing gum comprises any chewable and substantially water-insoluble gum base in an amount ranging from approximately 18% to 99%, but preferably about 25%, by weight of the total chewing gum composition. The gum base may contain a calcium carbonate filler instead of a talc filler even if the chewing gum composition comprises the dipeptide sweetener aspartame (L-aspartyl-L-phenylalanine methyl ester, originally disclosed in U.S. Pat. Nos. 3,492,131 and 3,642,491) or food acidulants. Although the calcium carbonate base has better chewing characteristics and is less expensive than the talc base, prior to the present invention, a talc base was in some cases preferred for use with aspartame and acids because calcium carbonate raises the gum pH and promotes degradation of the aspartame and neutralization of the acids; see, for example, U.S. Pat. No. 4,246,286 which covers gum products which are substantially free of calcium carbonate and strongly basic constituents in order to provide a storage-stable aapartame chewing gum.

According to the present invention, the chewing gum comprises one or more active ingredients in the group consisting of sweeteners, flavoring agents, food-grade acids, pharmaceutical agents or breath-freshening agents, with at least one of the active ingredients encapsulated in a food-grade shellac. The shellac encapsulation preferably is accomplished using a known fluidized bed coating method or a known roller bed coating method, although other coating methods can be used.

In the fluidized bed coating method, particles of the active ingredient are suspended in a stream of pressurized air and sprayed with a solution of the encapsulating agent. When the ethanol solvent for the shellac evaporates, a coated ingredient particle remains. The velocity of the air flow can be adjusted so that when the desired coating level is reached, the weight of the coated particle causes it to drop out of the air stream and into a collecting bin.

In the roller bed coating method, particles of the active ingredient are suspended in a solution of the encapsulating agent and its solvent. The active ingredient is not appreciably soluble in the solvent. The suspension is deposited on a heated, rotating drum; the heat evaporates the solvent, leaving coated ingredient particles which are scraped from the roller. This method can be repeated in order to obtain thicker coatings, but different solvent systems or more rapid roller speeds must then be used to avoid re-dissolving of the encapsulant.

The shellac encapsulant provides a moisture-impermeable hydrophobic coating which is not soluble in the chewing gum base, thereby affording excellent protection for the active gum ingredients, particularly dipeptide sweeteners which are sensitive to certain moisture and pH conditions and aldehydes which may be present in the gum. At the same time, the shellac encapsulant effects controlled, gradual release of the active ingredients to achieve extended gum sweetness and flavor and sustained dispensation of pharmaceutical agents.

The sweetener in the chewing gum may comprise a high-potency sweetener, that is, one having a sweetness greater than about twenty times that of sucrose. Such a sweetener may be aspartame, saccharin, cyclamate, thaumatin, acesulfame K, dihydrochalcones, or combinations thereof. A preferred sweetener is aspartame present in an amount ranging from about 0.025% to about 2.0% by weight of the gum composition. For this artificial sweetener, the shellac encapsulating agent is present in an amount ranging from about 5.0% to about 90.0%, but preferably about 25.0%, by weight of the aspartame.

The chewing gum composition may comprise flavoring agents, preferably spray or freeze dried flavoring agents such as essential oils and artificial flavors in an amount determined by preference; but generally the active flavoring agents comprise about 1% by weight of the chewing gum composition. Shellac encapsulation extends the release of the flavors and protects certain flavors from oxidation and other breakdown reactions. The shellac coating also prevents the absorption of flavor into the gum base, thus reducing the amount of costly flavor needed for a desired flavor level.

With some flavors, most notably fruit flavors, it is desirable to use a food-grade acid to impart a tartness to the gum. For this purpose, acids such as malic and citric acids can be employed at a level determined by preference, generally about 1% of the total gum weight. Shellac encapsulation of such acids results in their slow release during chewing to achieve a moderate, extended tartness. Other acids such as lactic and tartaric, which in the past were sometimes avoided due to their high solubilities and resulting undesirable tartness, can be used beneficially when encapsulated with shellac. The encapsulation also prevents neutralization of these acids when exposed to alkaline substances such as calcium carbonate.

Chewing gum has been used as a vehicle for pharmaceutical or medicinal agents such as aspirin and silver acetate, the latter employed as a smoking deterrent. Pharmaceutical agents are incorporated into the gum mass to delay and control the rate at which the pharmaceutical is released upon chewing of the gum for safe and effective dispensation. According to the present invention, shellac encapsulation of such pharmaceutical agents further controls their release rate and prevents irreversable absorption of such agents by the gum base.

The chewing gum composition may also comprise a breath-freshening agent which treats or reduces oral malodor. A suitable breath-freshening ingredient is copper gluconate (see, for example, U.S. Pat. No. 2,894,876) but other salts of copper or zinc may be used.

The chewing gum optionally comprises a coloring agent in a conventional amount of about 0.1% to about 2.0% by weight and a plasticizing agent in an amount of about 0.1% to about 25% by weight of the gum composition. Liquid flavors, which are not encapsulated, may also be included in the gum.

The chewing gum may also comprise a sweet, water-soluble bulking agent although non-caloric or low calorie gums can be prepared using no bulking agent or bulking agents which have little or no assimilable caloric value. For sugar gums, the bulking agent may consist of dextrose, sucrose, maltose, dextrin, dried invert sugar, fructose, levulose, galactose, corn syrup or corn syrup solids, or combinations thereof. For sugarless gums, the bulking agent may comprise Polydextrose (a low-calorie carbohydrate manufactured by Pfizer) or a sugar alcohol such as sorbitol, mannitol, xylitol, or combinations thereof. Such bulking agents are present in an amount ranging from about 30% to about 80% by weight of the entire chewing gum composition.

The chewing gum can be manufactured in a conventional manner. First, the base is heated and placed in a mixer. If coloring is desired, it may be added at this point, followed by the bulking agent, if any, the shellac-encapsulated active ingredient or ingredients and the plasticizing agent. When the chewing gum is removed from the mixer, the mixture is rolled or extruded, cut into individual pieces, cooled and then wrapped in a known manner.

EXAMPLE I

A sugarless chewing gum containing shellac-encapsulated aspartame was made according to the following formulation:

| Ingredient | Percent By Weight |
| --- | --- |
| Gum Base | 27.00 |
| Sorbitol Powder | 41.525 |
| 70% Sorbitol Solution | 10.00 |
| Mannitol Powder | 12.00 |
| Peppermint Flavor | 1.20 |
| Glycerine | 8.00 |
| Color | 0.025 |
| Shellac-encapsulated Aspartame | 0.25 |

EXAMPLE II

A sugar chewing gum containing shellac-encapsulated aspartame can be made according to the following formulation:

| Ingredient | Percent By Weight |
| --- | --- |
| Gum Base | 20.00 |
| Corn Syrup | 13.00 |
| Sugar | 64.75 |
| Glycerine | 1.00 |
| Peppermint Flavor | 1.00 |
| Shellac-encapsulated | 0.25 |

| Ingredient | Percent By Weight |
| --- | --- |
| Aspartame | |

For a breath-freshening gum, 0.006% by weight of shellac-encapsulated copper gluconate is added to the gum illustrated in Example II.

EXAMPLE III

A chewing gum containing a shellac-encapsulated food-grade acid and shellac-encapsulated aspartame can be made according to the following formulation:

| Ingredient | Percent By Weight |
| --- | --- |
| Gum Base | 25 |
| Sorbitol Powder | 47.125 |
| 70% Sorbitol Solution | 12 |
| Mannitol Powder | 8 |
| Glycerine | 6 |
| Color | 0.025 |
| Shellac-encapsulated Citric Acid | 0.8 |
| Flavor | 0.8 |
| Shellac-encapsulated Aspartame | 0.25 |

EXAMPLE IV

A chewing gum containing shellac-encapsulated aspirin, a shellac-encapsulated dried flavor and shellac-encapsulated aspartame can be made according to the following formulation:

| Ingredient | Percent By Weight |
| --- | --- |
| Gum Base | 27.00 |
| Sorbitol Powder | 28.725 |
| 70% Sorbitol Solution | 12.00 |
| Mannitol Powder | 8.00 |
| Glycerol | 6.00 |
| Color | 0.025 |
| Shellac-encapsulated Aspirin | 15.00 |
| Shellac-encapsulated Flavor | 3.00 |
| Shellac-encapsulated Aspartame | 0.25 |

In all of the foregoing examples, the shellac is present in an amount equal to 25.0% by weight of each encapsulated active ingredient to provide an impermeable, hydrophobic coating.

Although the present invention has been described in connection with specific embodiments, it will be recognized that numerous modifications both in the selection of the gum ingredients and in their amounts may be made without departing from the scope of the invention.

The embodiments of the invention in which an exclusive property of privilege is claimed are defined as follows:

1. A chewing gum composition comprising gum base, particles of a high-potency sweetener, and a food grade shellac encapsulant surrounding said particles of the sweetener.

2. The chewing gum composition of claim 1 wherein the sweetener is a dipeptide sweetener.

3. The chewing gum composition of claim 2 wherein the dipeptide sweetener is aspartame.

4. The chewing gum composition of claim 3 wherein the aspartame is present in an amount ranging from about 0.025% to about 2.0% by weight of the gum composition and the encapsulating agent is present in an amount ranging from about 5.0% to about 90.0% by weight of the aspartame.

5. The chewing gum composition of claim 4 wherein the shellac encapsulant is present in an amount of about 25.0% by weight of the aspartame.

* * * * *